United States Patent Office 3,552,984
Patented Jan. 5, 1971

3,552,984
GUNNABLE REFRACTORY
Jacques R. Martinet and Jim E. Allen, San Jose, Calif., assignors to Kaiser Aluminum & Chemical Corporation, Oakland, Calif., a corporation of Delaware
No Drawing. Filed Dec. 18, 1967, Ser. No. 691,189
Int. Cl. C04b 35/04, 35/52
U.S. Cl. 106—56
12 Claims

ABSTRACT OF THE DISCLOSURE

A gunnable refractory composition shows greatly enhanced sticking and reduced rebound, especially when gunned onto a hot surface, when plaster of paris is used as plasticizer in the composition. A preferred bond to achieve rapid setting is one containing both monosodium dihydrogen phosphate and potassium tripolyphosphate. A preferred composition also contains hydrated lime and carbon, for example in the form of graphite.

BACKGROUND OF THE INVENTION

There has been, in recent years, an increasing use of refractories in monolithic form. Particularly marked has been the increase in the application of such monolithic refractories by the gunning technique, wherein granular refractory material is conveyed to the gun nozzle where it is admixed with water and the admixture projected onto a furnace wall or other refractory structure. In this method of applying refractory compositions, it is customary to include a material, known as a plasticizer, which enables the refractory material to adhere to the furnace wall or other structure upon which it is gunned. Examples of such materials are swelling clays such as bentonite or an organic sticky material such as starch. It is also required that the bonding component of a gunnable refractory composition set up very rapidly so that the refractory quickly becomes a strong and coherent mass. This is particularly necessary when, as is frequently the practice, the refractory material is gunned onto a hot surface in order to effect repairs to a refractory structure without undue downtime. This invention is directed to the composition of a gunnable refractory meeting the foregoing criteria.

SUMMARY OF THE INVENTION

It has now been found, according to this invention, that a gunnable refractory composition consisting essentially of sized refractory aggregate, bond and plasticizer, shows greatly enhanced adherence, and lowered rebound, particularly when gunned onto hot surfaces, when there is used as plasticizer plaster of paris ($CaSO_4 \cdot \frac{1}{2} H_2O$), for example from about 1% to about 7% based on the total weight of the composition. It has also been found, according to this invention, that a particularly rapidly setting bond is one which includes both potassium tripolyphosphate ($K_5P_3O_{10}$; often abbreviated KTPP) and monosodium dihydrogen phosphate ($NaH_2PO_4$; often abbreviated MSP), for example from about 0.5% to about 5% potassium tripolyphosphate and from about 0.5% to about 5% potassium tripolyphosphate and from about 0.5% to about 5% monosodium dihydrogen phosphate, all percentages being by weight based on the total weight of the composition. Generally, it will be found desirable to limit the total amount of both MSP and KTPP to about 6% of the total composition by weight.

DETAILED DESCRIPTION

The aggregate used in the practice of this invention can be any refractory material, but the invention is particularly useful with basic refractory materials, especially periclase, and most especially with compositions containing a substantial proportion, e.g., at least 5% by weight of the total composition, of periclase passing a 100-mesh screen. With periclase can be used other compatible refractory materials, such as chromite, alumina, dolomite and the like. It will be understood that the refractory aggregate is sized-graded, as is well known in the art.

The plaster of paris used in the practice of this invention is the well-known article of commerce and is used in finely divided form, for example, substantially all passing a 100 mesh screen. As will be understood by those skilled in the art, this material, also known as the hemi-hydrate of gypsum, is formed by controlled calcination of gypsum. The hemi-hydrate, as is also well known, reacts with water to form, with a setting reaction, calcium sulfate containing two moles of water for each mole of calcium sulfate. It will be understood that small amounts of other plasticizers can be used in conjunction with the plaster of paris plasticizer of this invention, if desired.

While any bond material suitable for use in a gun mix can be used with compositions according to this invention containing plaster of paris as plasticizer, a particularly advantageous bond is one which includes both MSP and KTPP. MSP itself is known as a fast setting bond for use in gun mixes and other refractory compositions. KTPP, on the other hand, is known as a bond for refractory compositions, but it is known to be relatively slow-setting as compared to acidic phosphate materials, for example, MSP. Accordingly, it is often not suitable for use as the sole bonding material in gun mixes. Therefore, it is surprising that the combination of these two bonding materials results in a bond which is even faster setting than MSP alone. When used in the practice of this invention, the MSP and KTPP will preferably be used in finely divided powder form, for example substantially all passing a 100 mesh screen.

It will be understood by those skilled in the art that compositions according to this invention can include additional ingredients. For example, when MSP is used as a bond in a composition containing —100 mesh periclase, it is often advantageous to include hydrated lime, $Ca(OH)_2$. Also, for some applications it will be found advantageous to include in the compositions according to this invention carbon, for example, in the form of graphite. It has been observed that the inclusion of carbonaceous material in refractory compositions reduces their wettability by molten iron or steel. Thus, in applications where the refractory may be in contact with such molten metal, for example in a basic oxygen steelmaking furnace, the inclusion of graphite, for example, in the composition is often advantageous. It will be understood by those skilled in the art that the amount of carbon remaining in the refractory after heating is the important factor. Thus, when pitch is used as a source of carbon, more, for example from about 1% to about 8%, by weight of the total composition, will be used then when a source such as graphite is used, where from about 0.5% to about 5%, by weight of the total composition, can be used.

While the compositions of this invention are adapted to be gunned onto hot surfaces, they can be gunned cold. When so gunned, they do not exhibit cracking upon setting and drying, as do many prior art refractory compositions designed for hot gunning. Thus, the compositions of this invention are carefully balanced so as to form a good monolith refractory when gunned either hot or cold.

EXAMPLE 1

The following composition was admixed in the dry state: 87 parts periclase, 4 parts plaster of paris, 2 parts MSP, 2 parts KTPP, 1 part hydrated lime, 3 parts pitch, and 1 part volatilized silica, all parts being by weight. The periclase used had the following typical chemical analysis: 1.1% CaO, 2.1% silica, 0.3% alumina, 0.4% ferric oxide, 0.3% chromic oxide and (by difference) 95.8% MgO. The plaster of paris was a commercial casting plaster substantially all (at least 97%) passing a 100 mesh screen. The MSP and KTPP were anhydrous powders substantially all passing a 100 mesh screen. The hydrated lime and volatilized silica also substantially all passed a 100 mesh screen, with at least 90% passing a 25 mesh screen. The pitch was a flake pitch having a softening point of 310° F. and substantially all passing a 4 mesh screen but retained on a 35 mesh screen.

The preceding composition was projected through a gun nozzle where it was admixed with about 7% of water and gunned onto a hot furnace wall. The mix moved smoothly through the gunning apparatus and adhered well to the wall, there being less than 10% rebound and substantially no dusting or fogging in the area of the gunning operation. This composition according to this invention is to be compared with similar compositions of the prior art which used 1.5% bentonite swelling clay rather than plaster of paris as a plasticizer. These prior art compositions showed, when gunned under similar conditions, a rebound of about 25% and there was considerable dusting and fogging in the gunning area which obscured the operator's view of the surface.

The example, according to this invention, is also to be compared with a similar composition using MSP as a bond but containing no KTPP. This latter composition showed slight popping and a longer setting time.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, 3d edition, 1950, published by McGraw-Hill Book Company, at p. 963. For example, a 100 mesh screen opening corresponds to 147 microns and 200 mesh to 74 microns. Analyses of mineral components are reported in the usual manner, expressed as simple oxide, e.g., MgO, $SiO_2$, although the components may actually be present in various combinations, e.g., as a magnesium silicate.

Having now described the invention,
What is claimed is:

1. In a refractory composition adapted to be gunned onto refractory surfaces, said composition consisting essentially of refractory aggregate, a bond and a plasticizer, the improvement wherein said plasticizer consists essentially of from about 1% to about 7% plaster of paris, based on the total weight of the composition.

2. In a refractory composition adapted to be gunned onto refractory surfaces, said composition consisting essentially of refractory aggregate, bond and a plasticizer, the improvement wherein said bond consists essentially of from about 0.5% to about 5% monosodium dihydrogen phosphate and from about 0.5% to about 5% postassium tripolyphosphate and wherein said plasticizer consists essentially of from about 1% to about 7% plaster of paris, all percentages being by weight and based on the total weight of the composition.

3. A composition according to claim 2 wherein the total amount of monosodium dihydrogen phosphate and potassium dihydrogen phosphate is not over 6% by weight of the total composition.

4. A composition according to claim 2 wherein said refractory aggregate comprises a substantial proportion of periclase grain passing a 100-mesh screen.

5. A refractory composition according to claim 4 wherein said refractory aggregate is sized periclase.

6. In a refractory composition adapted to be gunned onto refractory surfaces, said composition consisting essentially of sized periclase refractory aggregate, a bond and a plasticizer, the improvement wherein said plasticizer consists essentially of from about 1% to about 7% plaster of paris, and said bond consists essentially of from about 0.5% to about 5% monosodium dihydrogen phosphate and from about 0.5% to about 5% potassium tripolyphosphate, all percentages being by weight and based on the total weight of the composition.

7. Refractory composition according to claim 6 containing about 4% plaster of paris, about 2% monosodium dihydrogen phosphate and about 2% potassium tripolyphosphate.

8. Refractory composition according to claim 6 containing hydrated lime.

9. Refractory composition according to claim 6 containing a source of carbon.

10. Refractory composition according to claim 9 containing from about 0.5% to about 5% graphite.

11. Refractory composition according to claim 9 containing from about 1% to about 8% pitch.

12. A refractory composition adapted to be gunned onto a refractory surface, said composition consisting essentially of size graded periclase refractory aggregate, about 4% plaster of paris, about 2% monosodium dihydrogen phosphate, about 2% potassium tripolyphosphate, about 1% hydrated lime, about 3% pitch and about 1% volatilized silica.

References Cited
UNITED STATES PATENTS

| | | | |
|---|---|---|---|
| 3,288,616 | 11/1966 | Bowman | 106—58 |
| 3,357,843 | 12/1967 | Bowman | 106—58 |

JAMES E. POER, Primary Examiner

U.S. Cl. X.R.

106—58, 59, 63

UNITED STATES PATENT OFFICE
CERTIFICATE OF CORRECTION

Patent No. 3,552,984            Dated January 5, 1971

Inventor(s) Jacques R. Martinet and Jim E. Allen

It is certified that error appears in the above-identified patent and that said Letters Patent are hereby corrected as shown below:

Column 1, lines 62-63, "potassium tripolyphosphate and from about 0.5% to about 5%" should be omitted (repetition) --; Column 3, line 8, "25" should be --325--.

Signed and sealed this 29th day of June 1971.

(SEAL)
Attest:

EDWARD M. FLETCHER, JR.            WILLIAM E. SCHUYLER, J
Attesting Officer                  Commissioner of Patent